United States Patent [19]

Balhouse

[11] 4,256,284
[45] Mar. 17, 1981

[54] HIGH ENERGY LOSS FLUID FLOW CONTROL DEVICE

[75] Inventor: Harold J. Balhouse, Corona, Calif.

[73] Assignees: Consolidated Controls Corporation, El Segundo; Electric power Research Institute, Inc., Palo Alto, both of Calif.

[21] Appl. No.: 26,838

[22] Filed: Apr. 4, 1979

[51] Int. Cl.³ .............................................. F16K 47/06
[52] U.S. Cl. .................................. 251/126; 251/282; 138/43; 138/46
[58] Field of Search ................ 251/126, 282; 138/43, 138/46

[56] References Cited

U.S. PATENT DOCUMENTS

| | | | |
|---|---|---|---|
| 3,095,006 | 6/1963 | Smith | 251/126 |
| 4,044,991 | 8/1977 | Waller | 251/126 X |
| 4,044,992 | 8/1977 | Jukoff | 251/126 |

FOREIGN PATENT DOCUMENTS

447105   3/1948   Canada .................................... 251/126

*Primary Examiner*—Arnold Rosenthal
*Attorney, Agent, or Firm*—Mason, Kolehmainen, Rathburn & Wyss

[57] ABSTRACT

A high energy loss fluid flow control device suitable for use with high temperature, abrasive coal liquids, gases and the like comprises an elongated body having an axially extending bore with longitudinally spaced apart inlet and outlet passages in communication with the bore. An elongated valve member is mounted for sliding axial movement within the bore between open and closed positions. The valve member includes an outer surface spiralling about a longitudinal axis from a maximum diameter portion adjacent one passage toward a minimum diameter portion adjacent the other passage. The bore of the elongated body includes a surface in close facing relation with the spiralling surface of the valve member and this surface also is spiralled about a longitudinal axis from a minimum diameter portion towards a maximum diameter portion. The cooperative spiralling surfaces of the bore and valve member define a spiral fluid flow path extending between the inlet and outlet passages having a generally polygonal, transverse cross-section which may be of constant or continuously increasing cross-sectional area between the inlet and outlet passages. Means is provided for moving the valve member longitudinally in the bore between open and closed positions. The flow control device has a unique step-tapered design providing for minimal clearance flow and fewer crevices or dead space wherein solid materials (commonly found in coal liquids and gases) can collect and interfere with operation.

21 Claims, 6 Drawing Figures

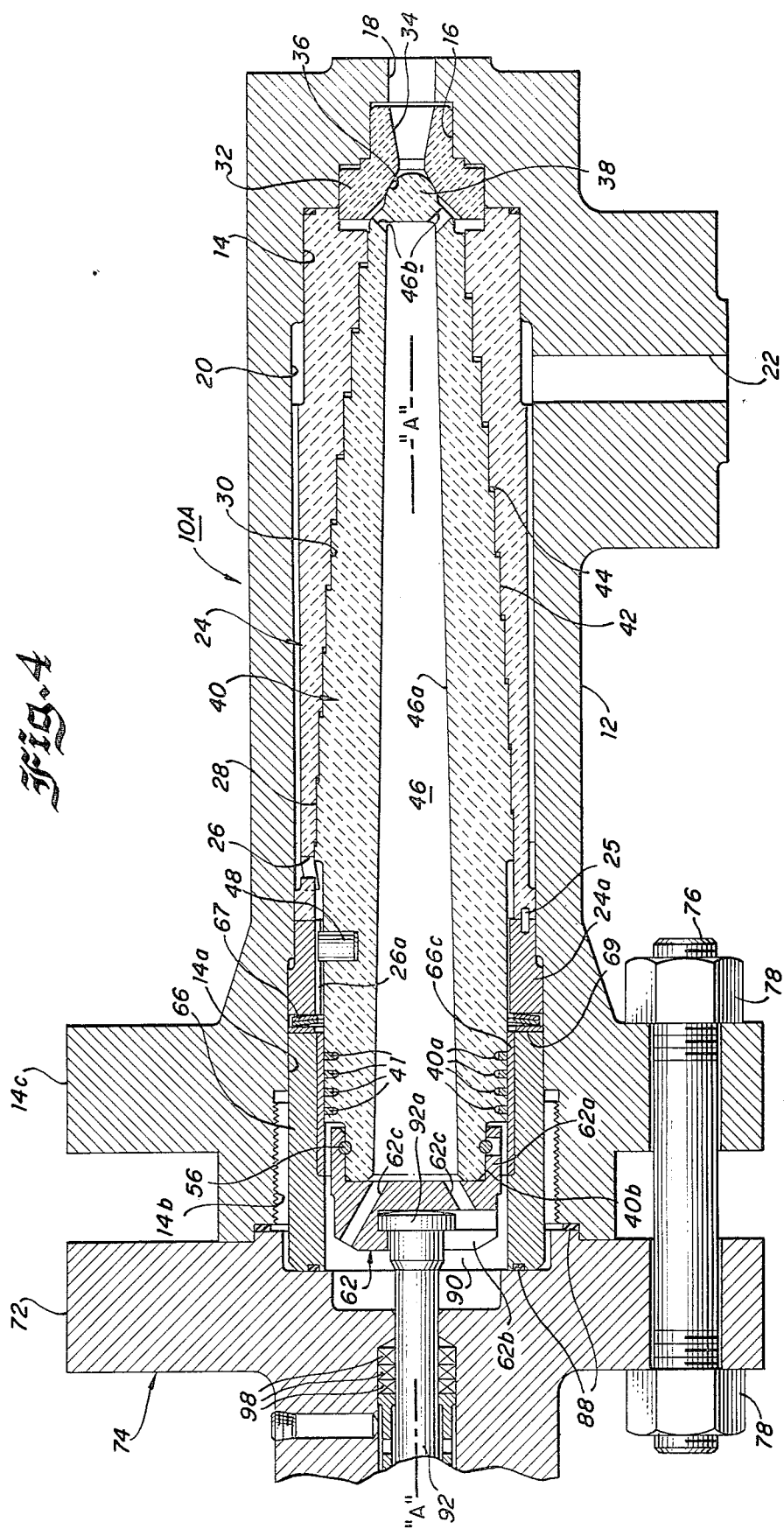

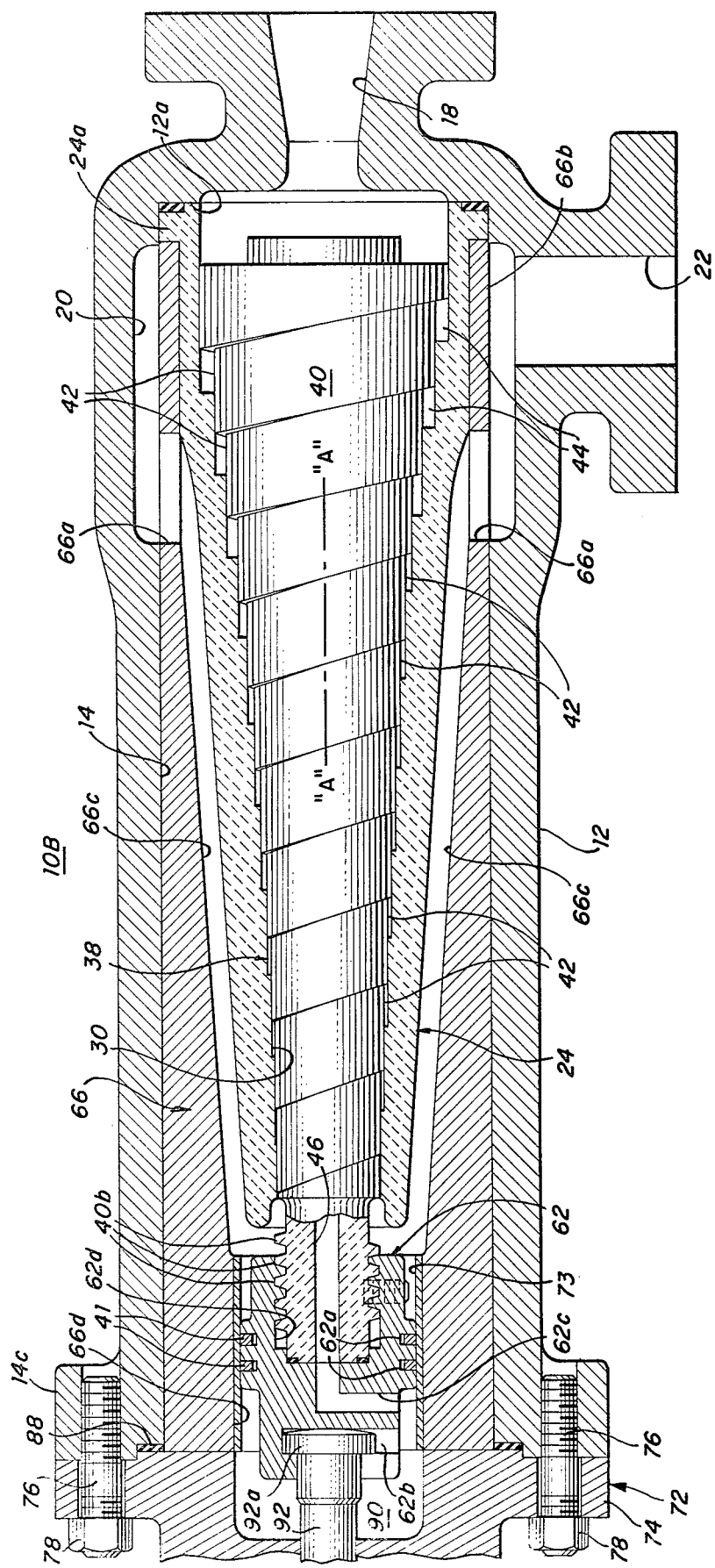

HIGH ENERGY LOSS FLUID FLOW CONTROL DEVICE

BACKGROUND OF THE INVENTION

1. Field of the Invention

The present invention relates to a new and improved high energy loss fluid flow control device and more particularly to a "letdown" valve suitable for use with high temperature, highly abrasive fluids such as those developed in coal liquefaction and gasification processes.

2. Description of the Prior Art

In U.S. Pat. No. 4,044,991, assigned to the same assignee as the present invention, there is illustrated a high energy loss fluid flow control device which is designed for use as a "letdown" valve for reducing the pressure of high temperature, highly abrasive gaseous fluids such as those that are developed in coal liquefaction and gasification processes. In U.S. Pat. No. 4,044,992, also owned by the same assignee as the present invention, there is illustrated yet another high energy loss fluid flow control device designed for use in the controlled reduction of fluid pressure of high temperature, highly abrasive fluids such as coal gas developed in coal liquefaction and gasification processes.

The high energy loss fluid flow control device of the present invention comprises an improvement on the control devices shown and described in the aforementioned patents and the novel device of the present invention for greatly reduced or minimized clearance flow volumes with a novel step-taper valve design wherein fewer crevices and dead spaces are present so that solids and other materials commonly found in coal fluids do not tend to collect and thereby interfere with normal operation.

It is an object of the present invention to provide a new and improved high energy loss fluid flow control device.

More particularly, it is an object of the invention to provide a flow control device suitable for use with high temperature, highly abrasive fluids such as those developed in coal liquefaction and gasification processes.

Another object of the present invention is to provide a new and improved pressure letdown type fluid flow control device of the character described.

Yet another object of the invention is to provide a new and improved flow control device wherein the pressure drop for clearance flow is only that pressure drop occurring across one turn of the spiral flow path of the device.

Yet another object of the invention is to provide a new and improved fluid flow control device of the character described wherein any clearance flow leaking past one turn of the helical flow path joins the main control flow in the next succeeding turn.

Another object of the present invention is to provide a new and improved fluid flow control device of the character described wherein a poppet type valve member may be initially inserted into position axially of the valve body with a threading type action thereby reducing the clearance tolerance required between the interfitting members to an absolute minimum and thereby reducing clearance flow.

Still another object of the present invention is to provide a new and improved fluid flow control device of the character described wherein the valve member is moved only longitudinally with respect to the valve body in order to open and close the valve, which movement is maximized to improve control accuracy and operational stability in the pressure reduction that is accomplished.

Yet another object of the present invention is to provide a new and improved fluid flow control device wherein a spiral flow path is provided for the fluid flow having inside and outside surfaces which are parallel to a longitudinal center line or axis of the device along the length of the valve.

Still another object of the present invention is to provide a new and improved high pressure fluid flow control device wherein the forces acting on the flow control or valve are balanced to minimize the force required to move the valve member, thereby minimizing the size of actuator required.

Still another object of the present invention is to provide a new and improved fluid flow control device of the character described wherein sealing and/or packing forces on the flow control valve member are minimized.

Yet another object of the present invention is to provide a new and improved fluid flow control device of the character described wherein a large overlap is provided between the mating spiral surfaces of the valve member and valve bore thereby minimizing clearance flow losses.

Still another object of the present invention is to provide a new and improved high pressure fluid flow control device of the character described wherein improved means is provided for attaching the valve member to a control system thereby insuring against loosening of the attaching connection and providing for cushioning in order to reduce the occurence of breakage due to impact forces.

Another object of the present invention is to provide a new and improved high energy loss fluid flow control device wherein means are provided to reduce bypass leakage and compensate for differential thermal expansion of the components.

Yet another object of the present invention is to provide a new and improved high energy loss fluid flow control device wherein flow erosion on the components is minimized.

Another object of the present invention is to provide a new and improved high pressure fluid flow control device of the character described having a spiral flow path with a substantially constant cross-sectional area.

Another object of the present invention is to provide a new and improved high pressure fluid flow control device of the character described adapted for use with non-flashing liquids.

Another object of the present invention is to provide a new and improved high pressure fluid flow control device of the character described having a spiral flow path with a continuously increasing cross-sectional area between a high pressure inlet and low pressure outlet.

Another object of the present invention is to provide a new and improved high pressure fluid flow control device of the character described in the preceding object wherein the cross-sectional area of the spiral flow path is progressively increased at the same rate as the specific volume of the fluid increases due to pressure reduction.

Another object of the present invention is to provide a new and improved high pressure fluid flow control device of the character described having a spiral flow path progressively increased in cross-sectioned area at substantially the same rate as the specific volume of the fluid increases due to pressure reduction resulting in a substantially constant velocity along the spiral flow path.

Another object of the present invention is to provide a new and improved high pressure fluid flow control device of the character described having a spiral flow path of novel design for minimizing erosion of the flow path surfaces, eliminating fluid cavitation by controlling fluid velocity and controlling the angle of fluid flow impingement against the flow path surfaces.

Another object of the present invention is to provide a new and improved high pressure fluid flow control device of the character described especially adapted to handle flashing liquids.

Another object of the present invention is to provide a new and improved high pressure fluid flow control device of the character described especially adapted to handle multi-phase fluids including liquid, gas and solid constituents.

Another object of the present invention is to provide a new and improved high pressure fluid flow control device of the character described especially adapted to handle fluids having components of widely differing specific gravities.

Another object of the present invention is to provide a new and improved high pressure fluid flow control device of the character described having a spiral flow path designed to provide a substantially constant velocity fluid flow between high pressure and low pressure ends.

BRIEF SUMMARY OF THE INVENTION

The foregoing and other objects and advantages of the present invention are accomplished in the disclosed embodiment by way of illustration and not limitation, which embodiment comprises a high energy loss fluid flow control device especially adapted for handling high temperature, abrasive fluids such as coal liquids and gases developed in coal liquefaction and gasification processes. The flow control device includes an elongated body having an axially extending bore with longitudinally spaced apart inlet and outlet passages in communication with the bore. An elongated valve member is mounted for controlled axial movement in the bore between closed and open, longitudinally spaced apart positions. The valve member includes an outer surface spiralling about a longitudinal axis of the member from a maximum diameter portion adjacent the inlet passage toward a minimum diameter portion adjacent the outlet passage. The facing and matching bore in the elongated body also includes a spiralling surface in closely spaced relation with the spiral surface of the valve member and also extending from a maximum diameter portion of the bore adjacent the inlet passage toward a minimum diameter portion adjacent the outlet passage. The facing spiralling surfaces of the valve body and valve member form a spiral fluid flow path extending between the inlet and outlet passages and having a generally polygonal shaped transverse cross-sectional area which may remain substantially constant or which may progressively increase in order to maintain a substantially constant fluid velocity when compressible fluids or flashing liquids are handled. Means is provided for moving the valve member longitudinally in the bore between open and closed positions to provide the desired high energy loss and pressure reduction in the fluid flow as required and selected.

BRIEF DESCRIPTION OF THE DRAWINGS

For a better understanding of the present invention, reference should be had to the following detailed description taken in conjunction with the drawings, in which:

FIG. 1a is a fragmentary, cross-sectional view taken substantially along lines 1a—1a of FIG. 1;

FIG. 4 is an enlarged, fragmentary, cross-sectional view similar to FIGS. 1 and 2 illustrating an end portion of another embodiment of a new and improved high energy loss fluid flow control device in accordance with the features of the present invention; and FIG. 5 is a longitudinal cross-sectional view similar to FIGS. 1 and 2 illustrating yet another embodiment of a new and improved high energy loss fluid flow control device in accordance with the features of the present invention.

DESCRIPTION OF THE PREFERRED EMBODIMENTS

Figure 1:
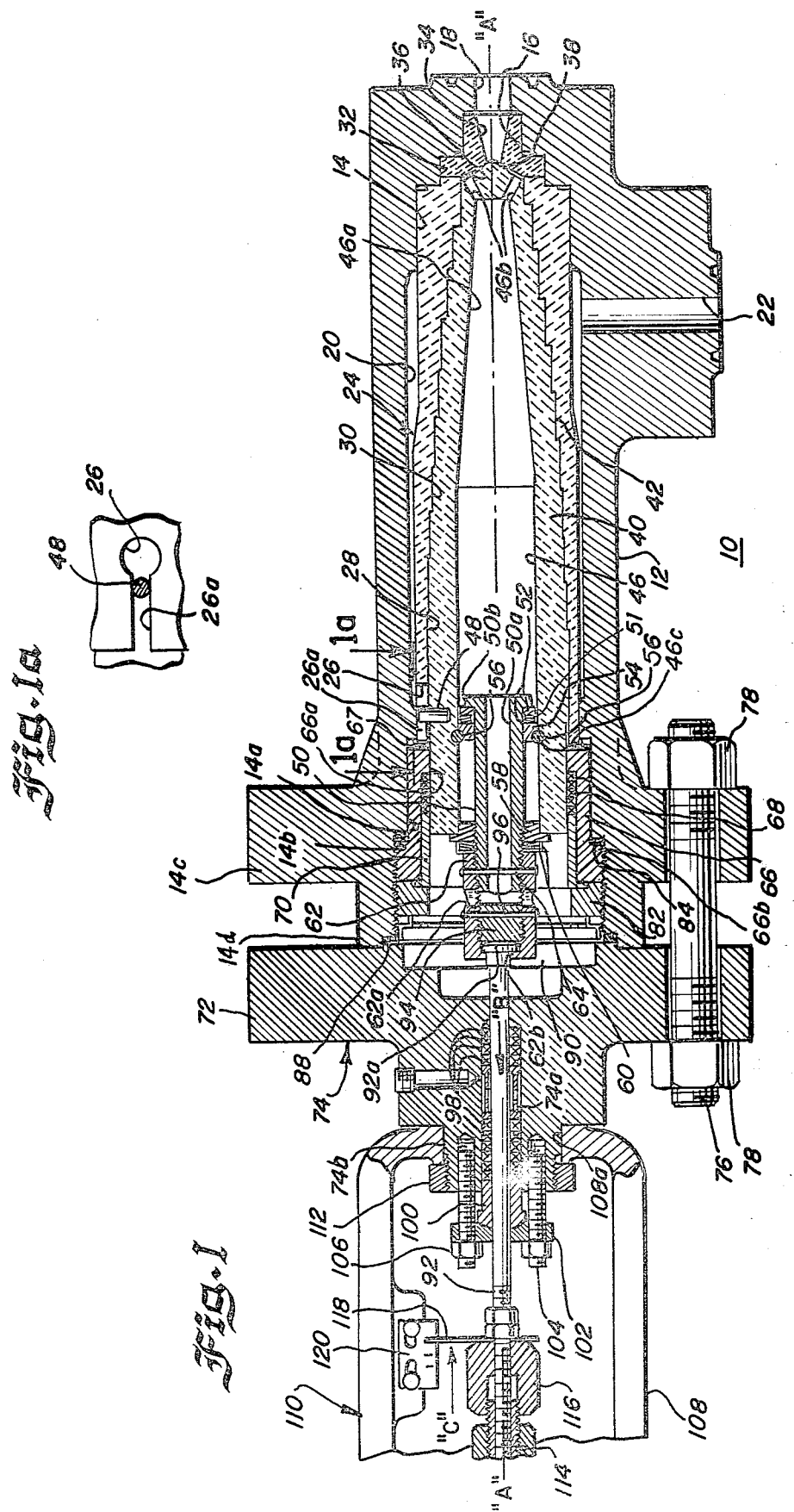
FIG. 1 is a longitudinal, cross-sectional view of a new and improved high energy loss fluid flow control device constructed in accordance with the features of the present invention.
Figure 2:
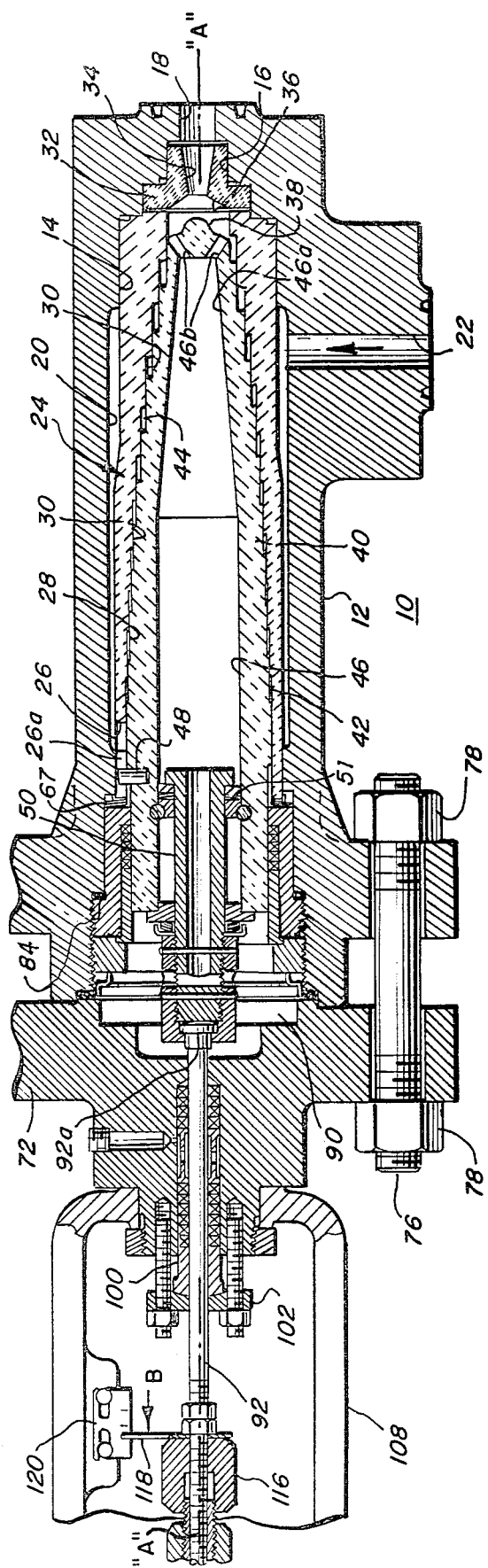
FIG. 2 is a longitudinal, cross-sectional view of the fluid flow control device of FIG. 1, illustrating the valve member thereof in an open position.
Figure 3:
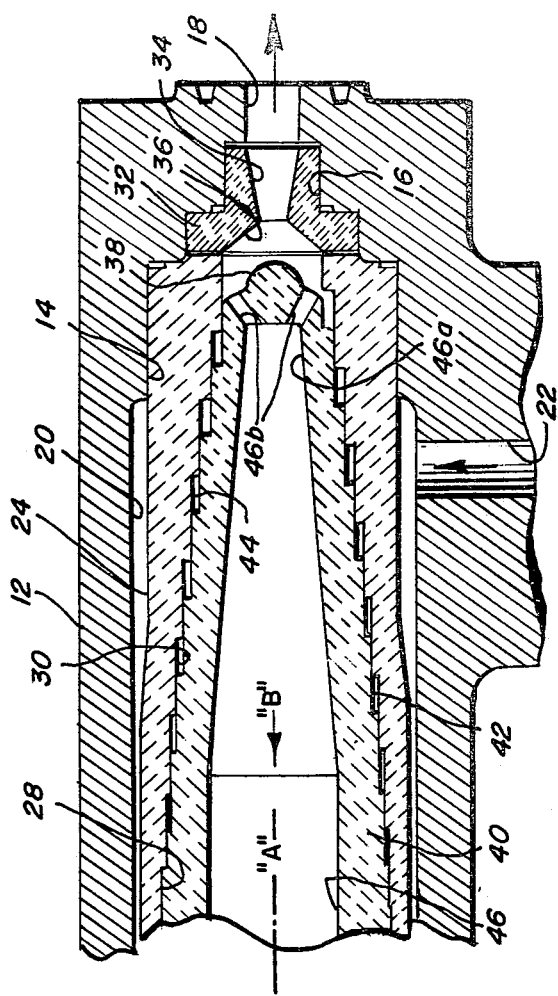
FIG. 3 is an enlarged fragmentary, cross-sectional view similar to FIG. 2, illustrating the valve in an open flow controlling position.

Referring now more particularly to FIGS. 1–3 of the drawings, therein is illustrated a new and improved high energy loss fluid flow control device constructed in accordance with the features of the present invention and referred to generally by the reference numeral 10.

The fluid flow control device 10 will hereinafter be referred to as a letdown valve and includes an elongated body or housing 12 having a cylindrical chamber 14 defined therein in communication at an outlet end through a stepped diameter, cylindrical opening 16 with a fluid outlet passage 18. The cylindrical chamber 14 is in communication with an annular fluid inlet passage 20 intermediate its length, which passage is adapted to be connected with a supply of incoming high pressure fluid through a radial, supply or inlet passage 22.

An elongated, hollow, tubular trim cage 24 of temperature and wear resistant material is seated in the elongated chamber 14 and is formed with an inlet opening 26 in communication with the annular inlet passage 20 of the valve body (as best shown in FIGS. 1 and 1a). The hollow trim cage 24 includes an axially extending inner bore 28 having an internally projecting spiral thread or land 30 extending between the maximum diameter end of the trim cage and the minimum diameter end portion adjacent the outlet opening 18. The internally projecting spiral thread surface 30 is parallel of the longitudinal central axis A—A and is progressively reduced in diameter each turn from the maximum diameter and toward the minimum diameter end.

The small diameter end of the trim cage is adapted to close or seat against the face of an annular valve seat 32 also formed of abrasion and wear resistent material and including a central outlet passage 34 expanding in cross-sectional area towards the lower end in communication with the outlet passage 18 in the valve body. The valve seat is formed with a concave annular valve seating surface 36 on its face around the opening 34 for seating engagement with a spherical surface 38 at the small diameter end of an elongated axially movable, hollow valve member or poppet 40 mounted coaxially within the hollow bore 28 of the trim cage.

The valve poppet 40 includes a generally cylindrical elongated body and is provided with a step-tapered thread surface 42 closely facing the bore surface 30 on the trim sleeve 24. The poppet thread surface continuously decreases in diameter from the maximum diameter end to the minimum diameter end and is parallel to the longitudinal valve axis A—A. The poppet is formed of abrasion and wear resistant material and the longitudinal spacing between adjacent turns of the mating surfaces 30 and 42 is greater than the progressive reduction in diameter for each turn. The confronting, spiral surfaces on the trim cage 24 and poppet 40 form a spiral flow passage 44 which communicates between the inlet opening 26 in the trim cage and the end of the valve poppet to provide a throttling flow passage for the fluid media when the valve poppet is opened (FIGS. 2 and 3).

As shown in FIG. 1, when the valve poppet 40 is in the closed position, the spherical surface 38 at the lower end of the poppet is seated against the frustroconical annular seating surface 36 on the valve seat 32 and in addition, the inlet slot 26 in the trim cage 24 is closed off by the adjacent body portion of the valve poppet. In order to open the valve and permit fluid flow from the annular inlet passage 20 down to the outlet passage 18, via the helical flow passage 44, the valve poppet 40 is moved axially in the direction of the arrow "B" of FIG. 3 and fluid enters via the inlet passage 20 in the valve body 12 through the opening 26 in the trim cage 24 into the upper end of the spiral or helical flow passage.

The poppet 40 is formed with an elongated axial recess 46 which is frustroconically tapered as at 46a and when the valve is opened, fluid may flow into the recess from the spiral flow passage 44 through a plurality of ports 46b in order to help balance the thrust forces on the valve poppet.

The spiralling surfaces 30 and 42 of the elongated bore of the trim sleeve 24 and the valve member 40, respectively, provide for a spiral flow path 44 having a transverse cross-section of expandable, generally rectangular shape whenever the valve poppet is opened as shown in FIGS. 2 and 3 by longitudinal movement toward the left as indicated by the arrow "B". The polygonal, rectangular shaped, transverse cross section of the spiral flow path 44 may be of constant area or may be continuously increased in area for each turn, progressing from the maximum or large diameter end of the flow passage towards the small diameter end adjacent the valve seat 32. For non-flashing process liquids, the spiral flow path 44 may be of substantially constant area, since the increase in fluid volume with a reduction in pressure is small. For compressible fluids, such as flashing liquids, vapors, or gases, the area of the flow path is progressively increased at the same rate as the fluid volume increases due to pressure reduction. In the former case, the step-tapered spiral surfaces are of substantially constant radial depth on each turn. In the latter case, the step-tapered spiral surfaces are increased in depth on each turn of the spiral, and accordingly, at the outlet or low pressure end of the valve poppet 40, the cross-sectional area of the helical flow passage is considerably larger than the cross-sectional area adjacent the inlet port 26. In both cases, the result is a substantially constant velocity of flow in the spiral flow passage as the fluid pressure is progressively reduced between the inlet passage 26 and the outlet passage 18. By adjusting the longitudinal position of the valve member 40 relative to the step-tapered spiral bore 30 of the trim cage 24, the exact cross-sectional flow area of the helical flow passage 44 may be adjusted as desired to provide the desired rate of fluid flow through the valve.

One of the most promising processes for converting abundant high sulphur coal to a clean burning fuel is known as the Solvent Refined Coal (SRC) process. In this process, coal is dissolved under heat and pressure to produce a slurry of dissolved coal and finely divided solids. This slurry is then processed further to remove sulphur and other impurities to produce a concentrated ash-free solid fuel. In a typical SRC plant, a letdown valve is used to control flow of the coal slurry from a high pressure vessel to a low pressure flash tank. The pressure drop is very high—up to 2400 psi across the valve and the coal slurry is extremely erosive or abrading on the letdown valve trim. In the letdown valves in present use, the best trim life experienced thus far, (even when made with tungsten carbide material and of a special design) is 90 days. A set of replacement tungsten carbide trim for a 1 inch valve may cost in excess of $1000 and when the added costs of labor for replacement plus consequent plant shutdowns are taken into account, the economic significance of the letdown valve erosion problem becomes self evident. The spiral flow path of the letdown valve of the present invention is designed to solve letdown valve erosion problems encountered with high temperature, highly abrasive fluids. The three most important factors governing the rate of erosion of valve materials have been found to be fluid velocity, the angle of fluid impingement on valve surfaces, and the type and wear resistance characteristics of the valve materials which define the flow path. Accordingly, to minimize valve surface erosion, one objective is to keep fluid velocity as low and as constant as possible, with no high velocity changes in direction or sudden changes in flow area. The impingement angle should generally be as small as possible and the materials should be erosion and corrosion resistant to the fluids handled. In the SRC and other liquefaction processes, the liquid normally enters the valve at the bubble point and most of it flashes into vapor as pressure is reduced in the valve.

In a conventional or prior art throttling valve, the total pressure drop is taken in one step, i.e., at the orifice created between the plug and seat. As a result, at very high pressure ratios, the vapor velocity near the seat will approach the speed of sound. Liquid droplets and solid particles in the stream will be propelled at this speed against the valve internal parts, rapidly eroding all except the very hardest materials. Sudden changes in direction and in flow area in the high flow velocity zone also tend to cause localized erosive wear on valve trim and downstream piping.

In the spiral flow path of the letdown valve of the present invention, the flow velocity is kept low by having the fluid follow a long, continuously curving flow path, analogous to a long pipeline, in which the pressure is gradually reduced in an infinite number of small steps. This result is achieved by the novel design concept in which the flow follows a spiral or helical path through the valve. There are no sharp turns or sudden changes in area in the spiral flow path. The flow area may be increased gradually as necessary to keep the velocity substantially constant as the fluid density decreases due to flashing. This configuration permits high letdown pressure ratios to be handled in a compact valve package.

The spiral flow path has a relatively large mean radius to keep the angle of impingement to a minimum and because the flow velocity is a small fraction of that in a conventional valve, a wider choice of trim materials is available. Relatively inexpensive erosion resistant materials, such as alumina ceramic, can be used, and when necessary, the valve trim can be easily changed without removing the valve from the pipeline.

The flow rate is controlled by movement of the poppet axially in the close fitting trim cage providing a linear relationship of flow versus valve position, and as will be described hereinafter. The poppet is pressure-balanced to minimize the size of actuator that is required, so that conventional valve actuators and positioners can be used to operate the valve of the present invention.

The unique step-taper design of the spiral flow passage 44 provides a number of advantageous features for the fluid flow control device 10. This unique design eliminates any dead channel space after the valve poppet 44 is moved out of the closed position and minimizes the amount of clearance flow through the valve by limiting the pressure drop across each turn of the spiral flow path to the amount occurring across that particular turn. This is an improvement over the prior art in which the pressure drop across each turn is the difference between the pressure in the turn and the pressure at the valve outlet, e.g., the pressure drop across the first turn is only slightly less than the total pressure difference between the valve inlet and outlet.

Any clearance flow leaking longitudinally past a turn of the spiral tends to join the main control flow in the next succeeding turn of the spiral flow path. In addition, during assembly of the fluid flow control device, the poppet valve member 40 can initially be screwed into the trim cage 24 before a key pin 48 is installed and this saves time and reduces the clearances required. The step-taper design results in fewer crevices and/or dead spaces where solids in the fluids may collect or interfere with the operation.

Because of the rectangular shaped cross-sectional flow area of the spiral flow path 44 there is provided a greater spacing in a longitudinal direction between turns than in the stepped radial dimension (as shown in FIGS. 2 and 3), and the clearance flow is thus greatly reduced. A relatively large amount of valve travel between the closed and the open positions may be provided, resulting in improved control accuracy and stability and without substantially increasing the clearance flow losses in a longitudinal direction between adjacent turns of the spiral flow path.

In addition, the hollow interior bore 46 of the poppet 40 provides an inlet for equalization of the thrust forces acting on the poppet because of differential pressures and only a small force in closing or opening is required to actuate the poppet. The introduction of downstream pressure into the hollow center of the poppet 40 via the ports 46b reduces the amount of closing thrust that would otherwise be required by the relatively high pressure differential effective between the inlet and outlet passages of the device as will be described in more detail hereinafter.

In accordance with the invention, the poppet valve member 40 is keyed to move only in a longitudinal direction with respect to the surrounding trim cage 24 by means of the radial key pin 48 which is slideably disposed within a longitudinal groove 26a (FIG. 1a) formed in the large diameter end portion of the trim cage and in communication with the inlet opening 26. The key pin 48 is slideable longitudinally between the opposite guiding side surfaces of the slot 26a so that relative rotational movement is positively restrained. Initial insertion of the valve in the trim cage is accomplished by threading or rotational action before the key pin 48 is inserted into place, but after the key pin and slot connection is completed only longitudinal displacement is permitted.

The poppet valve 40 is moved longitudinally back and forth along the axis A—A to open and close the flow control device by means of a hollow, axial stem 50 having a central bore 50a and an annular, outwardly extending radial flange 50b at one end inside the hollow recess 46 of the valve member. A pair of "Belleville" springs 51 and a ring 52 are mounted on the stem 50 adjacent the end flange 50b between the flange and an annular retaining ring 54 which is keyed to the valve member 40 by means of a snap ring 56 seated in an annular groove 46c spaced longitudinally inwardly from the outer or left hand end as viewed in FIGS. 1 and 2.

Adjacent the outer end of the poppet, there is provided a stepped, annular retaining ring 58 and another pair of "Belleville" type spring washers 60 and these washers bear against an adjacent end surface of a cup shaped stem connector 62 having an axial bore for receiving an outer end portion of the hollow valve stem 50. The valve stem is secured to the connector by means of mating threads, locked by a cross pin 64 extending between aligned openings provided in the valve stem 50 and side walls of the stem connector. The "Belleville" spring washers 51 and 60 provide a shock resistant positive connection between the hollow valve stem 50 and the valve member 40 and accommodate dimensional differences because of thermal expansion and contraction.

Adjacent the left hand end (FIGS. 1 and 2), the elongated valve body 12 is formed with enlarged diameter chamber sections 14a and 14b, respectively, and an annular packing sleeve 66 having an inwardly directed radial flange portion 66a at the inner end and an outwardly directed radial end flange at the outer end is seated within the large diameter chamber segment 14b. An annular gasket 84 seals between sleeve 66 and the shoulder separating chamber sections 14a and 14b. A plurality of annular packing rings 68 are mounted around the cylindrical outer end portion of the valve member 40 within the cylinder 66 and an annular packing gland 70 is inserted between the sleeve and valve to compress the packing rings and form a sliding seal. A pair of "Belleville" spring washers 67 are provided between the inner end of the packing sleeve 66 and the end of the trim sleeve 24 to accommodate dimensional differences caused by thermal expansion and contraction as the trim sleeve heats and cools down. When the trim sleeve is formed of brittle material, the washers 67 help to prevent breakage.

As illustrated, the body 12 includes a large, outwardly extending radial flange 14c at the left hand end as viewed in FIG. 1, and this flange is interconnected with a similar flange 72 of an attached cap member 74 by means of a plurality of flange bolts 76 and nuts 78.

As illustrated, the body 12 also includes an annular extension 14d immediately to the left of flange 14c, as viewed in FIG. 1. Inside annular extension 14d there is provided an annular packing gland retaining ring 82 having one annular face bearing against the outer end of the packing gland 70. A gasket 88 is provided to seal between the opposite annular faces of the body 12 and the adjacent planar, annular face of enlarged flange 72, so that cap member 74 and body 12 form a pressure balancing chamber 90 which is in fluid communication with the hollow recess 46 of the valve member 40 via the bore 50a of the valve stem 50 and a plurality of radial ports 62a provided in the valve stem connector 62. From the foregoing it will be seen that when the valve member 40 is opened by movement of the valve stem 50 to the left as indicated by the arrow "B", the fluid flowing in the spiral flow path 44 may enter the interior recess 46 of the valve member through the ports 46b and may eventually flow into the balancing chamber 90 through the hollow bore 50a of the valve stem 50 and the radial ports 62a in the side wall of the cup shaped stem connector 62. This fluid pressure is then able to act against the outer end of the valve member 40 and exert a closing force toward the right on the valve member against the direction of the force or thrust developed because of the high pressure fluids moving around the spiral flow passage 44 toward the outlet passage 18.

The spring washers 60 and 51 interposed in the connector between the valve member 40 and stem 50 provide for shock cushioning against the forces developed during opening and closing of the valve and the packing rings 68 seal effectively against the outer body surface of the valve member 40 within the enlarged step chamber 14a and 14b of the elongated chamber 14 in the body 12. This balancing of thrust forces on the valve poppet 40 by the pressure chamber 90 reduces the amount of force needed to open and close the valve.

The outer end of the valve stem connector 62 is provided with a reduced diameter bore section in an end wall 62b through which is received one end portion of an actuator rod 92 having an enlarged, flanged end portion 92a. The rod extends outwardly through an elongated axial bore 74a provided in the outwardly extending central stem portion of the cap member 74. Flanged end portion 92a of the rod is retained against the end wall of the cup shaped stem connector 62 by the left end of valve stem 50, which is keyed to the side walls of the stem connector by a cross pin 96. It will thus be seen that longitudinal axial movement of the operator stem 92 is effective to open and close the valve member 40 and seat and unseat the spherical surface 38 at the small diameter end portion of the valve against the concave valve seating surface 36 of the annular valve seat 32.

A plurality of packing rings 98 are provided in the bore 74a to provide a sliding seal around the stem 92 and an annular packing gland 100 is secured in place in the outer end portion of this bore to compress the packing rings. The gland is held in place by a packing flange 102 and threaded stud bolts 104 and nuts 106 connecting the flange with the cap member 74.

Movement of the valve poppet 40 between open, closed and intermediate positions is selectively controlled by a valve actuator 110 which may be of the type manufactured and sold by the Fisher Controls Company and adapted to move the stem 92 longitudinally in selected incremental amounts to provide the desired operating characteristics. The valve actuator includes a cage-like frame 108 having an aperture 108a at the valve end which is seated on an outwardly projecting threaded collar portion 74b provided on the cap member 74 and the frame is secured to the cap member by a threaded lock ring 112.

The valve actuator includes a diaphragm or piston (not shown) adapted to precisely move an operating element 114 which is interconnected to the outer end of the stem 92 by means of a flexible coupling 116. A pointer or indicator 118 is secured to the coupling for indicating the precise position of the valve member on a graduated scale 120 mounted on the frame 108. The positioning unit is activated to provide precision control in moving the stem 92 to position and reposition the poppet element 40 within the step-tapered bore 28 of the trim cage 24.

Referring now to FIG. 4, therein is illustrated another embodiment of a high pressure fluid flow control device constructed in accordance with the features of the present invention and referred to generally by the reference numeral 10A. The same or similar reference numerals as those used in the prior embodiment will be utilized in the drawing of the flow control device of FIG. 4 and only the important differences between the two embodiments will be described herein in detail. The elongated hollow trim cage 24 of the device 10A is provided with a metal ring-like portion 24a at the left end having a stepped outer surface adapted to seat within the annular inlet bore passage 20 and in the slightly larger in diameter valve body bore 14a. The ring-like portion 24a is preferably formed of metal or other strong material and is keyed to the end of the main body portion of the elongated hollow trim cage with one or more key pins 25 provided at circumferentially spaced apart locations. The ring-like portion is provided with a longitudinally extending key groove 26a for receiving the outer end portion of the key pin 48 mounted on the valve poppet 40 and this keyed engagement prevents relative rotation between the valve poppet and trim cage while permitting longitudinal sliding displacement of the poppet within the spiral bore of the valve trim cage.

The trim cage 24 is positively secured in seated position in the fluid device body 12 with a pair of "Belleville" type spring washers 67 and a pressure plate 69 adjacent the left hand end, and a cylinder 66 bears against the pressure plate. A gasket 88 is mounted in the outer end of the cylinder and bears against an inner, shouldered surface of the radial flange 72. The cylinder 66 is provided with a metal cylinder liner 66c having a smooth inner bore surface slightly larger in diameter than the outer diameter of the left hand end portion of the valve poppet 40. The poppet is formed with a plurality of longitudinally spaced apart, radially inwardly extending grooves 40a in which are mounted piston rings 41 adapted to provide a good sliding seal between the left hand end portion of the valve poppet and the internal bore of the cylinder 66 on the metal cylinder liner 66c thereof.

As in the prior embodiment, the "Belleville" type spring washers 66 accommodate any differences in dimensional tolerances because of thermal expansion or contraction and reduce any stresses that would otherwise be caused thereby. Thus, the trim cage 24 may be formed of relatively weak or fragile, ceramic type materials and the like which are well suited for high temperature and wear resistance environments but which have a low mechanical strength. The flanged end 92a of the operating stem 92 is keyed into a radial key slot 62b of a T-shaped transverse cross-section that is formed in an annular, cup shaped, stem connector 62. The connector includes a thin-walled collar 62a adapted to encircle a shouldered portion 40b provided on the outer surface at the left-hand outer end of the valve poppet 40. The cup shaped connector 62 is secured to move the valve poppet by means of a C-ring 56 and the valve poppet is thus moved longitudinally to open and close the flow control device as desired and as more fully described hereinbefore.

The stem connector 62 is provided with a plurality of fluid passages 62c which provide fluid communication between the balancing chamber 90 around the stem 92 and the interior bore 46 of the valve poppet 40 so that minimal thrust forces are required for moving the poppet between open, closed, and intermediate positions within the trim cage 24.

As in the previous embodiment, the spiral flow passage 44 that is defined between the mating or confronting surfaces 42 and 30 of the valve poppet 40 and the trim cage 24, respectively, are of a rectangular transverse cross-section taken on a longitudinal plane extending radially outwardly of the longitudinal axis A—A. It should be noted that the radial distance between the flow passage cross-section and the axis of generation A—A decreases between the left hand portion of the valve poppet moving towards the right hand or outlet end portion, however, the radial dimension of the spiral flow passage increases from turn to turn moving toward the outlet end. The amount of increase in cross-sectional flow area is proportioned for the particular fluid being handled so that as the fluid pressure is reduced between the inlet passage as it flows toward the outlet passage, the cross-sectional area is increased to maintain a substantially constant fluid flow velocity.

The constant flow velocity provides an extremely efficient process with a minimum of abrasive wear on the valve surfaces and is especially well suited for flashing type liquids which tend to vaporize when the pressure is reduced in the flow process in the device. It should also be noted that the radial dimension of the cross-sectional flow area of the fluid flow passage 44 is relatively small in comparison to the longitudinal dimension of the flow passage cross-section taken in a radial plane extending from the axis A—A, and accordingly, the impingement angle of the fluid flowing spirally against the surfaces 42 and 30 is relatively small and wear and abrasion are thereby minimized.

These factors coupled with the absence of abrupt changes in cross-sectional area or flow direction provides an extremely efficient letdown valve. The use of piston rings 41 provides a good seal between the cylinder liner 66c and the left hand end portion of the valve poppet 40.

Referring to FIG. 5, therein is illustrated another embodiment of a new and improved high pressure letdown valve indicated generally by the reference numeral 10B. The same or similar reference numerals will be used to identify parts similar or identical to those in the prior embodiments and only the differences between the embodiment of FIG. 5 and the prior embodiments will be discussed herein in detail.

The letdown device 10B is especially designed for handling flashing type liquids and/or multiphase (liquid/gas/solid) type fluids. The body 12 of the letdown valve is provided with an annular inlet passage 20 in communication with the radial passage 22 and the annular passage is relatively short in length longitudinally of the body in comparison with the prior embodiments. Fluid from the radial inlet passage 22 flows longitudinally in the valve towards the left hand end portion after first passing through a plurality of radially spaced ports 66a formed in a generally cylindrical, thin wall end section 66b at the right hand end of a generally cylindrical, hollow sleeve 66 which is mounted within the cylindrical bore 14 of the valve body 12. The sleeve 66 includes a large, elongated, frustoconically tapered, axially aligned bore 66c extending between the ports 66a and a left hand portion of reduced diameter section 66d. The fluid entering the valve body 12 via the radial inlet passage 22 flows around the annular inlet passage 20 and inwardly through the ports 66a before moving longitudinally and inwardly in the frustoconical passage or bore 66c of the sleeve toward the left hand end portion of the bore.

The left hand cylindrical end portion 66d is provided with a metal cylinder liner 73 having an inner surface slidably engaged by a pair of piston rings 41 which are mounted in annular grooves 62a formed on an enlarged diameter portion of a generally cup-shaped connector sleeve 62 having a T-shaped radial key way 62b at the outer end portion adapted to receive the flanged ends 92a of an operating stem 92 as in the prior embodiment.

The cup-shaped connector 62 is formed with a threaded, internal bore 62d opening toward the right hand end portion and this bore is adapted to threadedly receive a minimum diameter, left hand end portion of an elongated, spirally tapered valve poppet 40.

The valve poppet 40 includes an elongated axial passage 46 communicating via the left hand end thereof with a passage 62c in the cup-shaped, sleeve connector 62 for equalizing the pressure in the balancing chamber 90 with the opposite end of the poppet for balancing the longitudinally directed thrust forces on the valve poppet when the valve is opened and closed as in the prior embodiment.

The left hand end portion of the valve poppet 40 is formed with a plurality of external threads 40b which are threaded into engagement with the internally threaded bore 62d of the cup-shaped stem connector 62 so that as the stem 92 is moved axially along the longitudinal axes A—A, the valve poppet is moved longitudinally within the central bore of generally frustoconically shaped trim cage 24.

The trim cage has a flanged right hand end 24a which is seated between an annular shouldered surface 12a of the valve body and the right hand end 66b of the hollow sleeve 66 as shown and is thus positively secured in place within the bore 14 of the valve body 12. The valve poppet 40 is movable longitudinally along the axis "A—A" toward and away from the outlet passage 18.

A spiral flow path 44 is formed by facing spiral surfaces 30 and 42 of the trim cage 24 and valve poppet 40, respectively, and this spiral flow progressively increases in diameter from the left hand end towards the right hand end as illustrated. The transverse cross-sectional flow area of the spiral flow path 44 also increases from left to right as shown in a proportion suited to maintain a substantially constant flow velocity for flashing type and/or multiphase fluids handled in the device. As the fluid entering the left hand end portion of the spiral flow passage 44, it begins to flow in a spiral direction around the passage towards the outlet 18 of the valve body and as this occurs, the heavier fractions contained in the fluid are thrown towards the outer surface 30 of the flow path by centrifugal action. The lighter fractions or constituents of the fluid tend to remain near the inner poppet surface 42 and this provides an advantage in that because the clearances between the poppet and the trim cage are always adjacent the outer diameter portion of the flow path on the down stream side, the heavier phases or fractions being generally of higher viscosity tend to create an outer seal against fluid leakage so that the lighter phases will not leak through the clearance area from turn to turn. This permits wider or greater manufacturing tolerances and greater clearances to be used with less chance of seizing or breakage of the poppet and/or trim cage due to thermal shock caused by heat induced contraction and/or expansion. The result is an extremely efficient letdown valve that is particularly well suited for handling multi-phase i.e. liquid/gas/solid type fluids commonly produced in coal liquification and gasification processes.

Although the present invention has been described with reference to several illustrated embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A high energy loss fluid flow control device comprising:
    an elongated body having an axially extending bore with longitudinally spaced apart inlet and outlet passages in communication with said bore;
    an elongated valve member mounted for axial movement in said bore between closed and open, longitudinally spaced apart position;
    said valve member including an outer surface spiralling about a longitudinal central axis of said member from a minimum diameter portion adjacent one of said passages toward a maximum diameter portion adjacent the other of said passages;
    said bore having a surface in close facing relation with said spiralling surface of said valve member and spiralling about said longitudinal axis from a minimum diameter portion adjacent said one passage toward a maximum diameter portion adjacent said other passage;
    said spiralling surfaces of said bore and valve member defining a spiral fluid flow path extending between said inlet passage and said outlet passage having a generally polygonal cross-section transverse cross-sectional area as viewed on a plane extending radially outward of said longitudinal axis, said cross-sectional area having a radial dimension substantially smaller than its dimension normal thereto extending longitudinally of said axis,
    said spiralling surface of said maximum diameter portion of said valve member gradually transitioning into a cylindrical surface of said member extending oppositely away from said minimum diameter portion in an axial direction,
    said spiralling surface at said maximum diameter portion of said bore of said valve body transitioning gradually into a cylindrical surface extending oppositely away from said minimum diameter portion in an axial direction; and
    means for moving said valve member longitudinally in said bore between said open and closed positions.

2. The high energy loss fluid flow control device of claim 1 wherein said spiralling surfaces are spaced radially outwardly of said longitudinal center axis and increase in radial spacing distance from said axis between said longitudinally spaced passages.

3. The high energy loss fluid flow control device of claim 1 wherein said spiral flow path has a generally rectangular, transverse cross-section as viewed on a plane extending radially outwardly of said longitudinal axis.

4. The high energy loss fluid flow control device of claim 1 wherein said spiral flow path has a substantially constant pitch and the spiralling surfaces of said body bore and valve member decreases a selected incremental amount in diameter for each turn away from said maximum diameter portion.

5. The high energy loss fluid flow control device of claim 1 wherein said valve member is formed with an elongated axial bore extending between said maximum diameter and minimum diameter portions, and includes an end closure adjacent said minimum diameter portion having an external valve surface thereon, and an annular valve seat in said bore of said body adjacent said minimum diameter portion thereof adapted to sealingly engage said valve surface around said outlet passage when said valve member is in said closed position relative to said bore.

6. The high energy loss fluid flow control device of claim 5 including one or more fluid ports in said valve member extending between said internal bore thereof and an outer surface adjacent said valve surface for introducing fluid into the interior of said valve member for balancing the same when said member is in said open position with said valve surface away from said valve seat.

7. The high energy loss fluid flow control device of claim 1 wherein said valve body includes an inner tubular sleeve mounted in a cavity in an outer body member, said sleeve forming said bore and having a port adjacent said maximum diameter portion forming a portion of said inlet passage for directing fluid flow into said spiral flow path when said valve member is opened.

8. The high energy loss fluid flow control device of claim 2 wherein said moving means is operable to move said valve member relative to said body on a stroke of selected length between said open and closed position and wherein said spiral flow passages have a transverse dimension parallel of said center axis greater than said stroke length.

9. The high energy loss fluid flow control device of claim 1 wherein said transverse flow cross-section of said spiralling fluid flow path is dimensioned to progressively increase between said passages at a rate providing a substantially constant fluid velocity along said spiralling path.

10. The high energy loss fluid flow control device of claim 9 wherein said transverse flow cross-section is increased in said radial dimension between said passages.

11. The high energy loss fluid flow control device of claims 9 or 10 wherein said transverse flow cross-section is provided with a substantially constant dimension in a longitudinal direction between said passages.

12. The high energy loss fluid flow control device of claim 2 wherein said increase in radial spacing progresses from said inlet passage toward said outlet passage.

13. The high energy loss fluid flow control device of claim 2 wherein said increase in radial spacing progresses from said outlet passage toward said inlet passage.

14. A high energy loss fluid flow control device comprising:

an elongated body having an axially extending bore with longitudinally spaced apart inlet and outlet passages in communication with said bore;

an elongated valve member mounted for axial movement in said bore between closed and open, longitudinally spaced apart position;

said valve member including an outer surface spiralling about a longitudinal central axis of said member from a minimum diameter portion adjacent one of said passages toward a maximum diameter portion adjacent the other of said passages;

said bore having a surface in close facing relation with said spiralling surface of said valve member and spiralling about said longitudinal axis from a minimum diameter portion adjacent said one passage toward a maximum diameter portion adjacent said other passage;

said spiralling surfaces of said bore and valve member defining a spiral fluid flow path extending between said inlet passage and said outlet passage having a generally polygonal cross-section transverse cross-sectional area as viewed on a plane extending radially outward of said longitudinal axis, said cross-sectional area having a radial dimension substantially smaller than its dimension normal thereto extending longitudinally of said axis;

key means adjacent said maximum diameter portion of said valve member and body interconnecting the same to permit relative longitudinal displacement and prevent relative rotational displacement when said valve member is moved between said open and closed positions; and means for moving said valve member longitudinally in said bore between said open and closed positions.

15. The high energy loss fluid flow control device of claim 14 wherein said spiralling surfaces are spaced radially outwardly of said longitudinal center axis and increase in radial spacing distance from said axis between said longitudinally spaced passages.

16. The high energy loss fluid flow control device of claim 14 wherein said spiral flow path has a generally rectangular, transverse cross-section as viewed on a plane extending radially outwardly of said longitudinal axis.

17. The high energy loss fluid flow control device of claim 14 wherein said spiral flow path has a substantially constant pitch and the spiralling surfaces of said body bore and valve member decreases a selected incremental amount in diameter for each turn between said maximum diameter portion.

18. The high energy loss fluid flow control device of claim 14 wherein said valve member is formed with an elongated axial bore extending between said maximum diameter and minimum diameter portions, and includes an end closure adjacent said minimum diameter portion having an external valve surface thereon, and an annular valve seat in said bore of said body adjacent said minimum diameter portion thereof adapted to sealingly engage said valve surface around said outlet passage when said valve member is in said closed position relative to said bore.

19. The high energy loss fluid flow control device of claim 18 including one or more fluid ports in said valve member extending between said internal bore thereof and an outer surface adjacent said valve surface for introducing fluid into the interior of said valve member for balancing the same when said member is in said open position with said valve surface spaced away from said valve seat.

20. The high energy loss fluid flow control device of claim 14 wherein said valve body includes an inner tubular sleeve mounted in a cavity in an outer body member, said sleeve forming said bore and having a port adjacent said maximum diameter portion forming a portion of said inlet passage for directing fluid flow into said spiral flow path when said valve member is opened, and said key means slidably interconnecting said sleeve and said valve member for relative longitudinal movement.

21. The high energy loss fluid flow control device of claim 14 wherein said transverse flow cross-section of said spiralling fluid flow path is dimensioned to progressively increase between said passages at a rate providing a substantially constant fluid velocity along said spiralling path.

* * * * *